(12) United States Patent
Ford et al.

(10) Patent No.: US 6,895,414 B2
(45) Date of Patent: May 17, 2005

(54) METHOD AND APPARATUS FOR AUTHORIZING AND REPORTING CHANGES TO DEVICE CONFIGURATIONS

(75) Inventors: Tobias Ford, Annapolis, MD (US); Greg Hayes, Severna Park, MD (US); Erik Dahl, Annapolis, MD (US)

(73) Assignee: USinternet working, Inc.

( * ) Notice: Subject to any disclaimer, the term of this patent is extended or adjusted under 35 U.S.C. 154(b) by 153 days.

(21) Appl. No.: 09/950,596

(22) Filed: Sep. 12, 2001

(65) Prior Publication Data

US 2002/0112095 A1 Aug. 15, 2002

Related U.S. Application Data

(60) Provisional application No. 60/269,017, filed on Feb. 15, 2001.

(51) Int. Cl.[7] ............................................... G06F 17/00
(52) U.S. Cl. ....................................... 707/203; 707/202
(58) Field of Search ................................ 707/202, 203; 709/220, 221, 225

(56) References Cited

U.S. PATENT DOCUMENTS

| | | | |
|---|---|---|---|
| 4,218,738 A | 8/1980 | Matyas et al. | |
| 4,317,957 A | 3/1982 | Sendrow | |
| 4,672,572 A | 6/1987 | Alsberg | |
| 5,297,262 A * | 3/1994 | Cox et al. | 710/36 |
| 5,668,876 A | 9/1997 | Falk et al. | |
| 5,796,633 A * | 8/1998 | Burgess et al. | 702/187 |
| 6,385,196 B1 * | 5/2002 | Hayball et al. | 370/356 |
| 6,594,786 B1 * | 7/2003 | Connelly et al. | 714/50 |
| 2002/0026339 A1 * | 2/2002 | Frankland et al. | 705/7 |
| 2002/0078382 A1 * | 6/2002 | Sheikh et al. | 713/201 |
| 2002/0124064 A1 * | 9/2002 | Epstein et al. | 709/221 |
| 2002/0161826 A1 * | 10/2002 | Arteaga et al. | 709/203 |

OTHER PUBLICATIONS

U.S. Appl. No. 60/253,912.

* cited by examiner

*Primary Examiner*—Uyen Le
(74) *Attorney, Agent, or Firm*—Gibbons, Del Deo, Dolan, Griffinger and Vecchione

(57) ABSTRACT

A method and apparatus for tracking and reporting changes to configuration files as part of an overall system auditing function and as a measure of efficiency of change review board procedures. Changes in configuration of network devices made by submitters of such changes are recorded in a separate repository and, at appropriate intervals, forwarded to network administrators and subject matter experts both to verify the correctness of the literal change and to confirm that the changes have been previously approved.

4 Claims, 4 Drawing Sheets

METHOD AND APPARATUS FOR AUTHORIZING AND REPORTING CHANGES TO DEVICE CONFIGURATIONS

CROSS-REFERENCE(S) TO RELATED APPLICATION(S)

This application claims the benefit of U.S. Provisional Application Ser. No.: 60/269,017 filed on Feb. 15, 2001.

RELATED APPLICATIONS

This application is related to the following co-pending application, the disclosures of which are incorporated into this specification by reference.

U.S. patent application Ser. No. 09/950,725, entitled AUTHENTICATION AND AUTHORIZATION FOR ACCESS TO REMOTE PRODUCTION DEVICES.(USi 4)

FIELD OF THE INVENTION

The present invention relates to methods of file configuration management, and more particularly, to a method and apparatus for reporting and certifying changes to device configuration files.

BACKGROUND OF THE INVENTION

In IT environments it is customary for a plurality of software developers and/or administrators to work with a particular computing system. For example, many software projects are too large for a single developer, and thus there are a plurality of developers writing the source code for such projects. In such environments, measures must be taken to avoid conflicts between two or more developers. In particular, source code is usually divided into a plurality of source files, and thus only one developer should be able to work on a given component/source file at a time. Otherwise, two or more developers could simultaneously make changes to the same portion of the source code, and when these developers save the changes to permanent storage (e.g., disk), only the changes made by one of these developers would actually be stored. Consequently, it is standard practice to use a software configuration management system, in which developers must "check out" a particular source file before they can make changes to the file. Once checked out, the source file becomes "locked" in the configuration management system, and accordingly no other person can check out the file to make changes until the developer who checked out the file checks the file back in.

Furthermore, modem software engineering practice often involves a formal process for making software changes, since haphazard changes can potentially introduce bugs or adversely affect the functionality of the overall software. Accordingly, a developer or team of developers typically must submit a formal request before actually performing changes to the software. Such "change requests" typically describe desired behavioral changes to the system (referred to as figurative changes), and identify exactly what will be changed in which files (literal changes) to accomplish the proposed change in functionality. Change requests are typically submitted to a designated group of individuals with the authority to review the proposed change, and approve or reject the change. This designated group, often referred to as a review board, commonly comprises an administrator and a plurality of subject matter experts.

Two problems can occur in such an environment. First, the approved change can be performed improperly (e.g., a developer may change a file that was not specified in the change request). Second, a developer could circumvent the approval process and make changes without ever submitting a change request. (It is not uncommon for developers to view the process of change requests as a "hassle".) In either case the potential for total system failure can be very large, and it can be very difficult if not impossible to identify the cause of failures due to such undocumented changes.

SUMMARY OF THE INVENTION

The present invention is directed toward the automatic identification of unauthorized changes to a distributed computing system. In particular, the invention tracks and monitors changes to configurations of devices in the computing system. Exemplary devices in a distributed computing system include routers, switches, firewalls, and servers. The configuration for a device is typically stored in a set of persistent text files.

The monitoring system of the present invention employs a software that downloads configurations of each device being monitored, and stores the configuration in a version control repository. The software, for example, can be a version control tool called CVS. The configurations can change over time, and accordingly the version control repository keeps track of each subsequent version and allows "rollback" to a prior configuration. When the monitoring system detects a change in a configuration, an alert is sent to two individuals: the system administrator of the particular device to which the configuration pertains, and a member of the change review board. Thus, the configuration changes can be certified or the original configuration can be restored, where appropriate.

As part of the invention changed device configurations are stored temporarily along with original device configurations to provide approving authority without opportunity to "rollback" to an original configuration. If changes are approved the original configuration is dropped from a memory and the changed configuration replaces the original device configuration in memory.

By reporting back to the appropriate subject matter expert (s) of the review board, literal changes can be mapped to the figurative change requests. Additionally, the effectiveness of the change review board in controlling change can be ascertained.

BRIEF DESCRIPTION OF THE DRAWINGS

The teachings of the present invention can be readily understood by considering the following detailed description in conjunction with the accompanying drawings, in which.

DETAILED DESCRIPTION

The method of the present invention involves two tasks which are performed sequentially: changing the configuration of a device, and reporting completed changes to designated individuals of the review board. Each of these two tasks comprises a plurality of steps.

Figure 1:
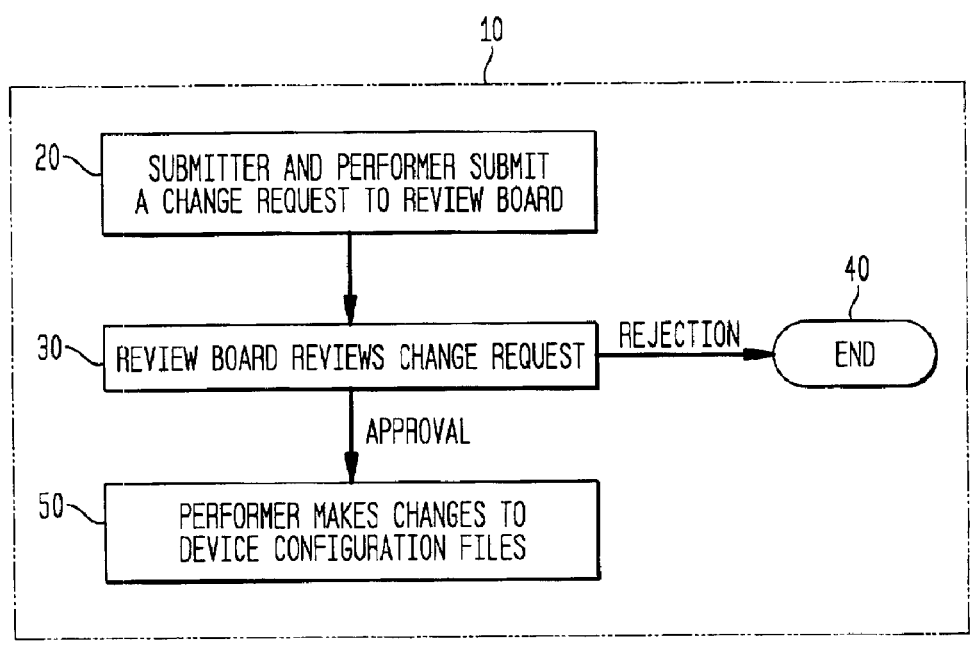
FIG. 1 is a process flow diagram for an exemplary method of changing a device configuration according to the principles of the invention.

FIG. 1 shows a process flow diagram for first task 10, changing the configuration of a device. First, a team of two individuals called the submitter and the performer submits a change request to the review board (20). The change request proposes to change the configuration C of a particular device D, where C consists of file set F. The review board, comprising a change control administrator and a plurality of subject matter experts, decides whether to approve or reject the change request (30). If the review board rejects the change request, the method of the present invention terminates 40 (i.e., the first task terminates, and the second task is never performed.) If the review board approves the change request, the performer makes the appropriate changes to files F, resulting in a new set of files F' (50). Step 50 marks the end of first task 10.

Figure 2:
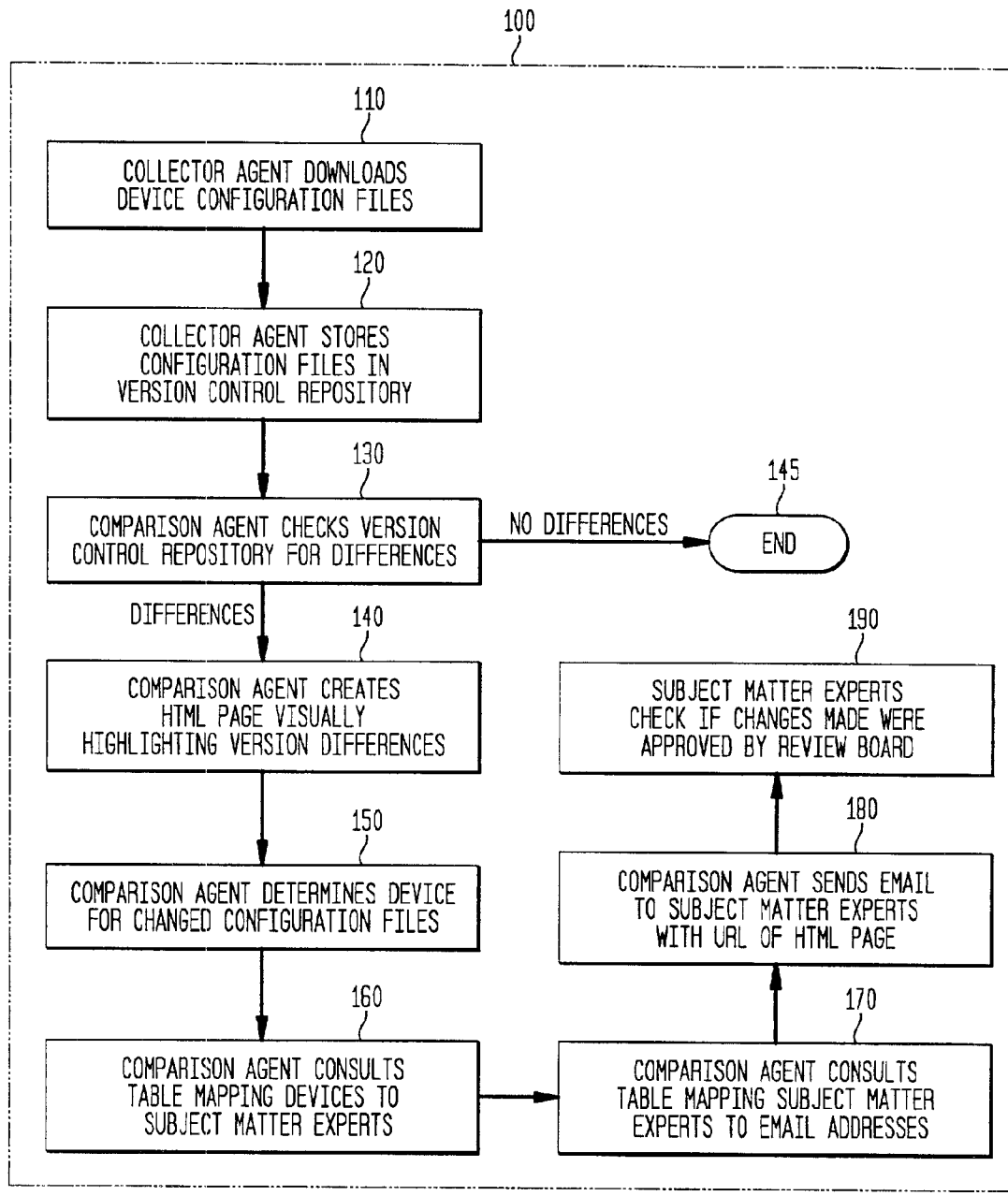
FIG. 2 is a process flow diagram for an exemplary method of reporting completed changes to designated individuals of the review board.

FIG. 2 shows the steps involved in second task 100, reporting completed changes to designated individuals of the review board. Second task 100 is initiated automatically when first task 10 completes. A collector agent downloads the device configuration files (110), and stores these files in a version control repository (120). A comparison agent consults the version control repository to determine whether there are any configuration files for which the most recent version differs from the previous version (130). If any such version differences are detected, the comparison agent creates an HTML page visually highlighting these version differences (140); otherwise, the second task terminates (145). The comparison agent then determines the device corresponding to the changed configuration files (150), and consults a table mapping each device to a list of one or more subject matter experts on the review board (160). The comparison agent subsequently consults a table mapping subject matter experts to email addresses (170), and sends an email to the proper addresses (180). The email notifies the subject matter experts of which configuration files were changed, and includes a URL to the created HTML page, thereby allowing the experts to conveniently view the exact changes made. In the last step (190) of second task 100, and accordingly the method of the present invention, the subject matter experts check whether the changes made had been approved beforehand by the review board.

In a preferred embodiment, the comparison agent can report only changes of interest to the review board. For example, a change in which only the timestamp of a file has been updated, but the contents of the file remain the same, would not be reported.

Figure 3:
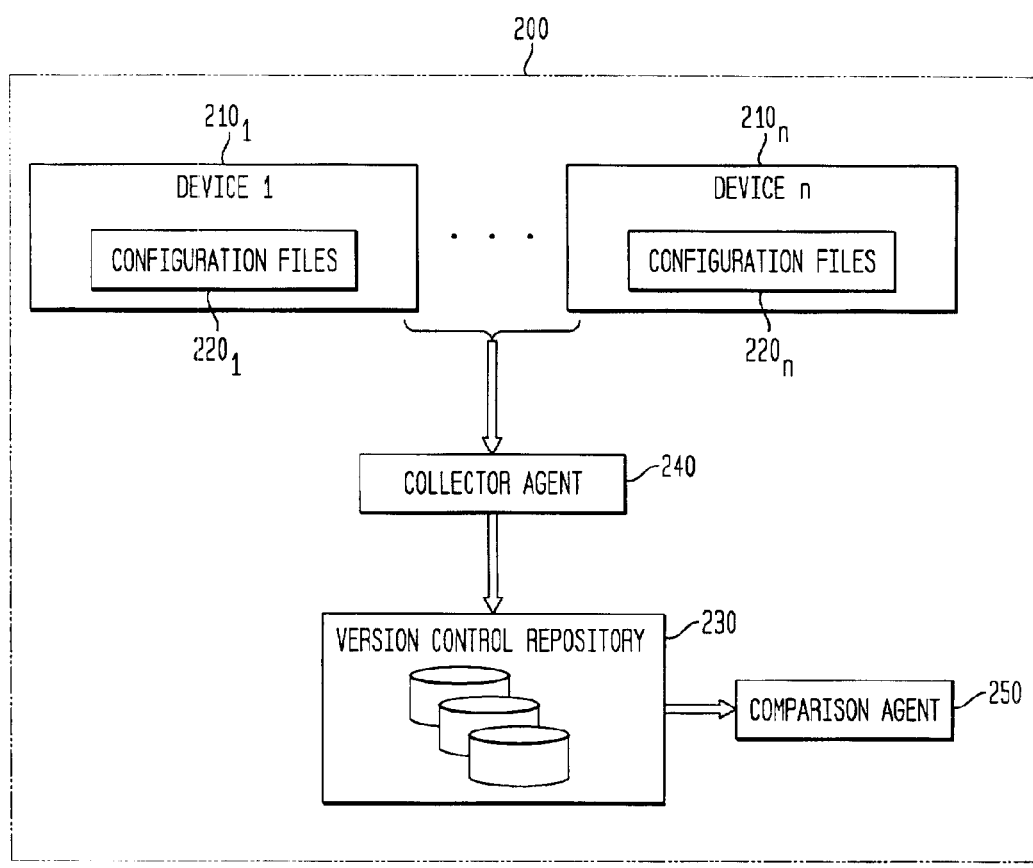
FIG. 3 is an exemplary block diagram of a monitoring system according to the principles of the invention.
Figure 4:
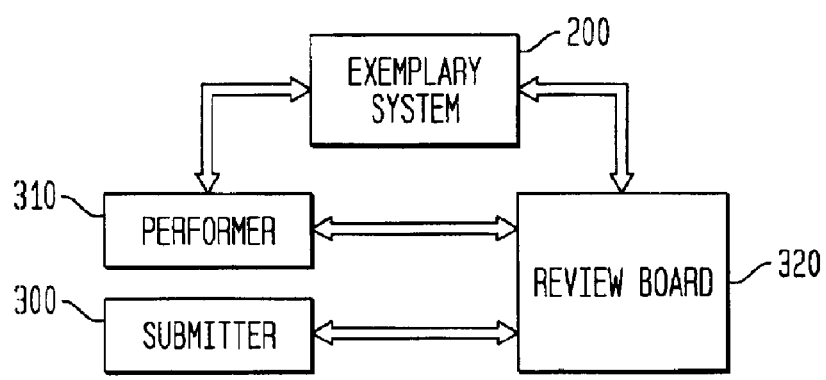
FIG. 4 illustrates the interactions among the apparatus of the present invention and the employees carrying out the method of the present invention.

A block diagram for an exemplary system 200 is shown in FIG. 3. The system comprises: a plurality of devices $210^1 \ldots 210^n$, each having a set of configuration files $210^1 \ldots 220^n$, a version control repository 230; a collector agent 240 that collects device configuration files and populates the repository with these files; and a comparison agent 250. Comparison agent 250 compares versions of configuration files in the repository, constructs an HTML page highlighting the version differences in files that have changed, and emails the appropriate subject matter experts, as enumerated in steps 130–190 of the method of the present invention. FIG. 4 shows the interactions among exemplary system 200, submitter 300, performer 310, and review board 320 according to the method of the present invention.

The present invention is not limited to the illustrative embodiments discussed herein. Rather, the invention includes other variations thereof. For example, the collector agent and comparison agent could be combined into a single software module. Similarly, the exact manner in which the comparison agent determines to whom email should be sent could be implemented differently, while retaining the same functionality.

The drawings and their description are only intended to illustrate the idea of the present invention. The details of the reporting configuration and the comparison agent that determines version differences as well as the specific method disclosed for verifying correctness may vary within the scope of the following claims. However, the breadth and scope of the present invention should not be limited by the above-described exemplary embodiments, but should be defined only in accordance but should be defined only in accordance with the following claims and their equivalents.

What is claimed is:

1. A method for authorizing and reporting configuration changes to devices in a network, the method comprising the steps of:

accepting a change request specifying a device in the network and a proposed configuration change to the device;

receiving notification when configuration files for devices in the network have been edited;

writing configuration files to a version control repository;

determining the version differences engendered by the editing of the configuration files;

creating an HTML page visually depicting the version differences; and sending an email message with a URL referencing the HTML page, the recipients of the email message determined by consulting a lookup table mapping the names of configuration files to email addresses.

2. The method of claim 1 further comprising the step of:

restoring a prior configuration in response to a request denying approval for a change request thereby effecting a rollback.

3. The method of claim 1 further comprising the step of:

certifying a change by tagging the change procedure as approved.

4. The method of claim 1 comprising the step of:

ascertaining that the email message containing version differences is sent to subject matter expert for the device configuration to be changed and to the system administrate.

* * * * *